United States Patent [19]

Slagel

[11] 4,109,670
[45] Aug. 29, 1978

[54] COMBINATION CHECK FLOW CONTROL AND SELECTOR VALVE

[76] Inventor: Roger D. Slagel, Plantation, Fla.

[21] Appl. No.: 540,492

[22] Filed: Jan. 13, 1975

Related U.S. Application Data

[63] Continuation of Ser. No. 360,685, May 16, 1973, abandoned, which is a continuation-in-part of Ser. No. 196,486, Nov. 8, 1971, abandoned.

[51] Int. Cl.² .................................................. F16K 21/00
[52] U.S. Cl. ................................. 137/119; 137/624.14; 137/624.18; 137/625.11
[58] Field of Search ...................... 137/625.11, 624.14, 137/624.18, 625.47, 625.15, 119

[56] References Cited

U.S. PATENT DOCUMENTS

| | | | |
|---|---|---|---|
| 2,679,376 | 5/1954 | Steiner | 251/58 |
| 2,833,309 | 5/1958 | Bird | 251/46 |
| 3,147,770 | 9/1964 | Perlis | 137/624.13 |
| 3,181,550 | 5/1965 | Okabe | 137/119 |
| 3,241,569 | 3/1966 | Sully et al. | 137/624.13 |
| 3,369,565 | 2/1968 | Haggard, Jr. | 137/625.11 |
| 3,431,933 | 3/1969 | Tidd | 137/625.47 X |
| 3,460,560 | 8/1969 | Kah, Jr. et al. | 137/315 X |
| 3,524,470 | 8/1970 | Kah, Jr. et al. | 137/625.11 |
| 3,635,237 | 1/1972 | Kah, Jr. | 137/624.18 |
| 3,642,022 | 2/1972 | Kirby | 137/625.11 X |

*Primary Examiner*—William R. Cline
*Attorney, Agent, or Firm*—Malin & Haley

[57] ABSTRACT

A combination check-flow control and selector valve that distributes fluid from a single inlet sequentially out through a plurality of outlets. The valve includes a housing with a selector chamber having a centrally located inlet and a plurality of outlets, a replaceable sequencing cam adjacent the top of the housing, a check-flow control valve means movable into and out of an inlet, and a selector valve including a sequencing sealing means rotatable and movable toward and away from the outlets. The selector valve is connected to the replaceable cam to direct the step-by-step movement of the sequencing sealing means in response to a minimum of fluid flow rate through the inlet as well as large fluid flow rates. The check-flow control valve means moves the sequencing sealing means into position adjacent the outlets just as it moves downwardly out of the inlet. The force and weight of the fluid acts on the sequencing sealing means to seal a plurality of the outlets.

9 Claims, 7 Drawing Figures

COMBINATION CHECK FLOW CONTROL AND SELECTOR VALVE

This is a continuation of application Ser. No. 360,685 filed May 16, 1973 now abandoned which is a continuation-in-part of application Ser. No. 196,486, filed Nov. 8, 1971 now abandoned.

BACKGROUND OF THE INVENTION

The invention relates to a combination check flow control and selector valve having a reciprocating and rotating sequencing sealing means and check-flow control valve means to distribute fluid from an inlet sequentially out through a plurality of outlets, and, more particularly, to a combination check-flow control and selector valve for minimum fluid flow rates.

In the past, sequencing valves have been designed to distribute fluid out through a plurality of outlets. Such devices have not adequately operated when a small fluid flow rate passes through the valve. Also, such valves have falsely cycled when the fluid is driven back through the valve due to various problems in the fluid system.

BRIEF DESCRIPTION OF THE INVENTION

The present invention relates to a combination check-flow control and selector valve that distributes fluid from a single centrally located inlet sequentially out through a plurality of outlets. The valve includes a housing with a single inlet adjacent the top of the housing and a plurality of outlets adjacent the bottom of the housing. The inlet is located about the vertical center line and the outlets are spaced an equal distance about said center line. The valve includes a vertically and rotatably movable stem centrally positioned in the housing between the bottom and the top of the housing. A check-flow control valve means is connected to the upper mid-portion of the stem and moves into the inlet to check back flow of the fluid and out of the inlet when subjected to even a low fluid-flow rate. The check flow control valve means just moves out of the inlet when the sealing means moves into contact with the bottom surface of the valve surrounding the outlet openings. The valve will operate at low fluid flow rates and large fluid flow rates. A spring is positioned between the sealing disc and the flow control valve means. The selector valve has a sequencing sealing means, in the general form of a cone or pyramid shaped disc, or sealing disc with at least one outlet opening therein. The sealing means is connected to the bottom portion of the stem and moves toward and away from the outlets to sequentially distribute fluid out the various outlets. Just as the check-flow control valve means moves out of the inlet, the stem moves the sealing means into contact with the bottom surface of the flow check valve surrounding the outlet openings. The valve includes another biasing means engaging the stem to normally position both the check-flow control valve means in the inlet and the sequencing sealing means out of engagement with the outlets in a no fluid flow condition as shown in FIG. 2. The engaging surface of the bottom of the housing adjacent the outlets has a slope less than the engaging surface of the disc. The force and weight of the water moving through the inlet engages the disc to seal it against the bottom of the housing. A replaceable cam is located in the top of the valve. The stem engages the replaceable cam to regulate the rotational movement of the disc in reference to the outlet openings.

It is an object of this invention to provide a selector valve that will operate effectively at low fluid flow rates.

Another object of this invention is to provide a combination check-flow control and selector valve that will not falsely operate by reason of fluid back flow.

A further object of this invention is to provide a selector valve with an easily accessible replaceable cam to vary the movement of the outlet opening in the sequencing sealing means.

In accordance with these and other objects which will be apparent hereinafter, the instant invention will now be described with particular reference to the accompanying drawings.

DESCRIPTION OF A PREFERRED EMBODIMENT

Figure 1:
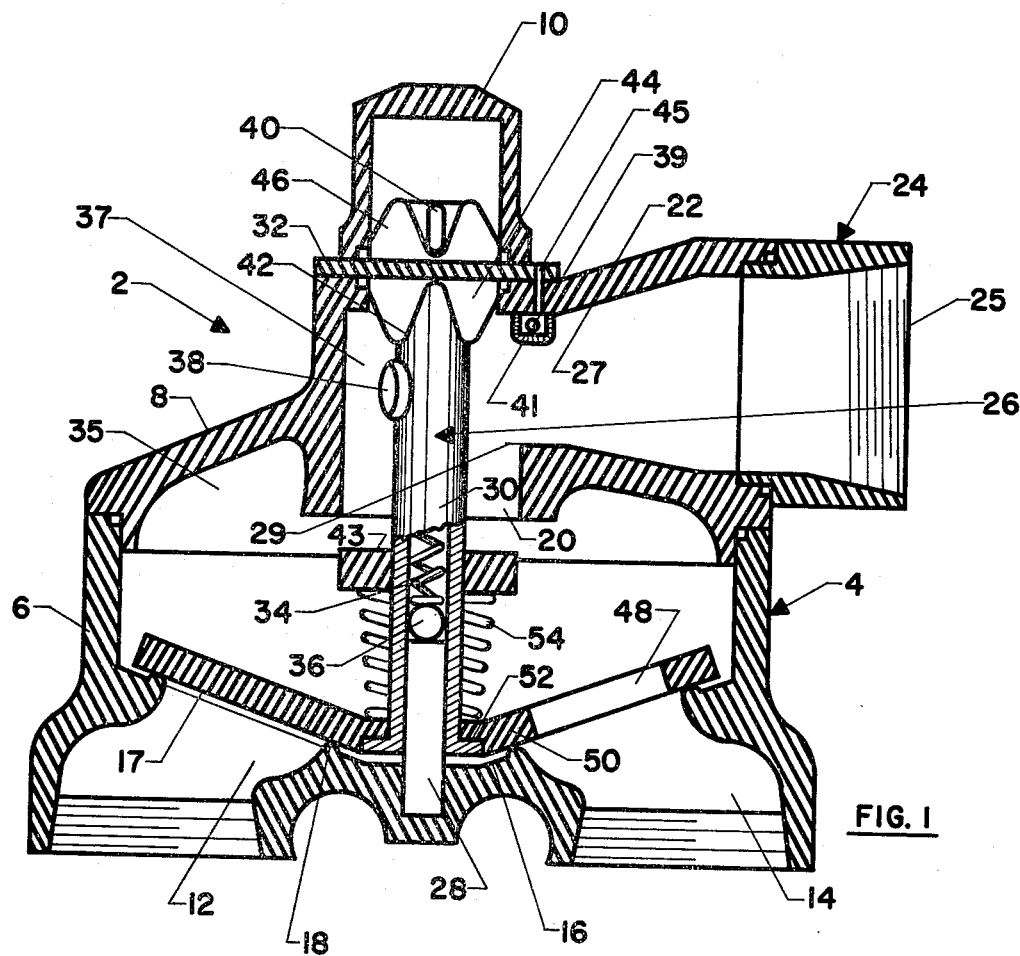
FIG. 1, is a cutaway side view of the valve in a second position with a high rate of fluid flowing through the inlet past the check-flow valve and out through one outlet with the sealing valve in a sealing position.

Referring now to the preferred embodiment of the invention, and, particularly to FIG. 1, the combination check and selector valve, generally illustrated by numeral 2, includes housing 4 with a main body member 6, upper body member 8 and removable cam cover 10. The main body member 6 includes four outlets, two of which are shown at 12 and 14. The engaging surface 16 slopes upward at an angle less than the upward slope of the disc surface 17, described in more detail herebelow. The generally concave, cone-shaped seat 16 may include ring portions 18 encircling each outlet opening. The upper body member 8 includes a centrally located inlet 20 with a side connecting system 22 and the fluid system connecting member 24. The outlets and inlet 25 are threaded to mate with the fluid piping system (now shown).

The stem means 26 includes a fixed axle 28 fixed in the base member 6. A movable stem 30 reciprocates and rotates on axle 28. The upper portion of movable stem 30 is held in an upright position by cam plate 32 located between cam cover 10 and the upper body member 8. The movable stem 30 is biased upward by spring 34 on ball bearing 36. The movable stem 30 includes two offset cam followers 38 and 40 that follow cam faces, two of which are shown as numeral 42 and 44 on cam 46. The cam 46 is fixed to the housing by cam plate 10. The cam 46 controls the stem movement to move opening 48 in disc 50 between each of the four outlets. The disc 50 may have an engaging surface in the shape of a cone, pyramid or cone-pyramid or a frustrum.

The cam followers provide positive movement of the movable stem 30 during its vertical rotational movement. The stem cannot skip and moves in a step-by step rotary manner. In the illustrated housing with four outlets the disc moves 45° with each upward movement and 45° with each downward movement. The movable stem rotates a half step when the movable stem moves upward and rotates a second half step when the movable stem moves downward. With each step the disc rotates ninety degrees.

Figure 4:
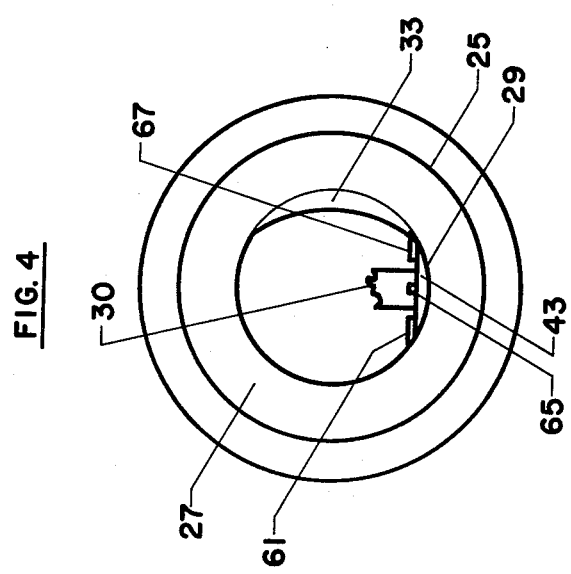
FIG. 4, is a side view looking into the inlet opening.

Referring to FIGS. 1 and 4, the inlet opening 25 includes a restricting wall 27 and an entrance 29 into the upper valve chamber 37. The valve entrance 29 includes a directional vane 33, as shown in FIG. 4, to provide a circular flow of fluid in the upper valve chamber 37 and lower or main valve chamber 35 in the designed direction of rotation of sealing disc 50. The circular flow fo fluid aids the rotational movement of check disc 43 and sealing disc 50. The check disc 43, fixed on stem 30, may include four upwardly projecting vane wings, three of which are shown as 61, 63 and 65 in FIG. 2, and three of which are shown as 61, 65 and 67 in FIG. 4. The fluid directed by vane 33 acts on the wings to aid the rotation of sealing disc 50.

To further aid rotation of sealing disc 50, the disc is balanced by adding weight adjacent opening 48.

Opening 45 through cam plate 32 and the upper wall of the housing provides a vent to relieve pressure differences created during the operation of the valve. The opening 45 prevents pressure lock-up of the sequencing valve. Ball 39 is held loosely in cage 49. Ball 39 closes the opening 45 when fluid enters the valve housing, to prevent loss of fluid.

Figure 3:
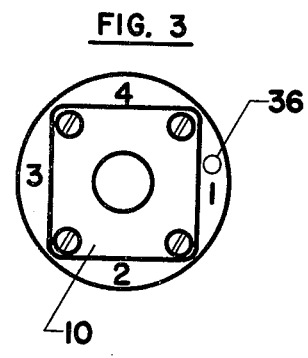
FIG. 3, is a top view of a portion of the valve shown in FIG. 1.

It should be noted, that the cover 10 may be easily removed by removing hold-down bolts, shown in FIG. 3. The four-way cam 46 may be removed in order to replace cam 46 with a three-way cam or a two-way cam. The three-way cam sequentially moves the opening 48 in sealing disc 50 between three housing outlets, skipping one outlet. The two-way cam sequentially moves the opening 48 in sealing disc 50 between two housing outlets, skipping two outlets. The housing may be designed with three, five, six or more outlet openings with the control cams designed as disclosed hereinabove.

The sequencing sealing disc 50 has a concave engaging surface. The seat 16 is also concave in shape with four outlet openings therein. The seat rises upwardly and outwardly, as shown in FIG. 1, at a more shallow rate than the sealing disc 50. The sequencing sealing disc 50 is held between flange 52 and spring 54. When fluid enters the valve and engages the check-flow control disc 43, stem 30 and sealing disc 50 are moved downwardly just as the check disc 43 moves out of inlet 20, the sealing disc 50 is placed against seat 16 or seat rings 18. The sealing disc is not sealed in its operating positions. As the fluid moves past the check and flow-control valve, as shown in FIG. 1, the fluid moves past check disc 43 onto the sealing disc 50 and moves the sealing disc 50 down into a sealing position, as shown in FIG. 1 Spring 54 is also compressed to aid in sealing the sealing disc 50. At a low fluid rate, the weight and the force of the fluid entering the lower housing chamber aids in sealing the disc 50 on seat rings 18.

Figure 2:
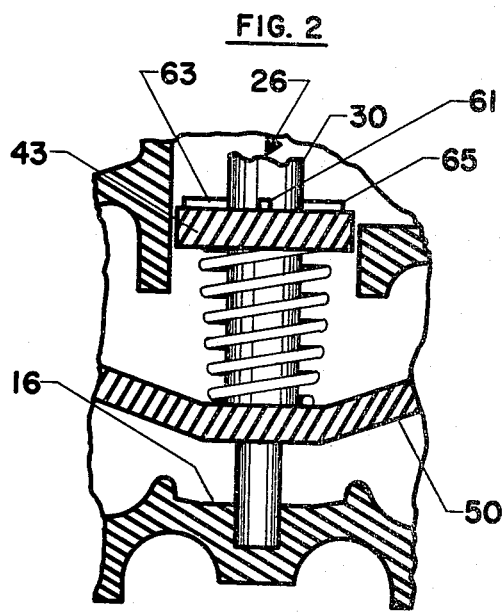
FIG. 2, is a cutaway side view of the valve in a first position preventing reverse fluid flow.

Return spring 34 is lighter than spring 54 to provide proper operating forces to place the check disc in the position shown in FIG. 2. The downward movement of sealing disc rotates opening 48 into alignment with the desired outlet. When the fluid flow is stopped, the sealing disc is automatically unsealed. The distal edge of the relient sealing disc 50 is moved away from the seat 16 into its normal configuration.

The base of the housing adjacent the outlets is designed to have a slope less than the engaging surface of sealing disc 50 to provide a means to automatically unseating the sealing disc 50. The resilient disc 50 will automatically unseat sealing disc 50 when the check disc 43 begins to enter inlet 20 and spring 54 is void of the sealing compression force. Thereafter, the check-flow control valve moves upward stopping back flow of fluid. The upward movement of the stem moves the disc 50 halfway toward the next outlet opening.

Figure 5:
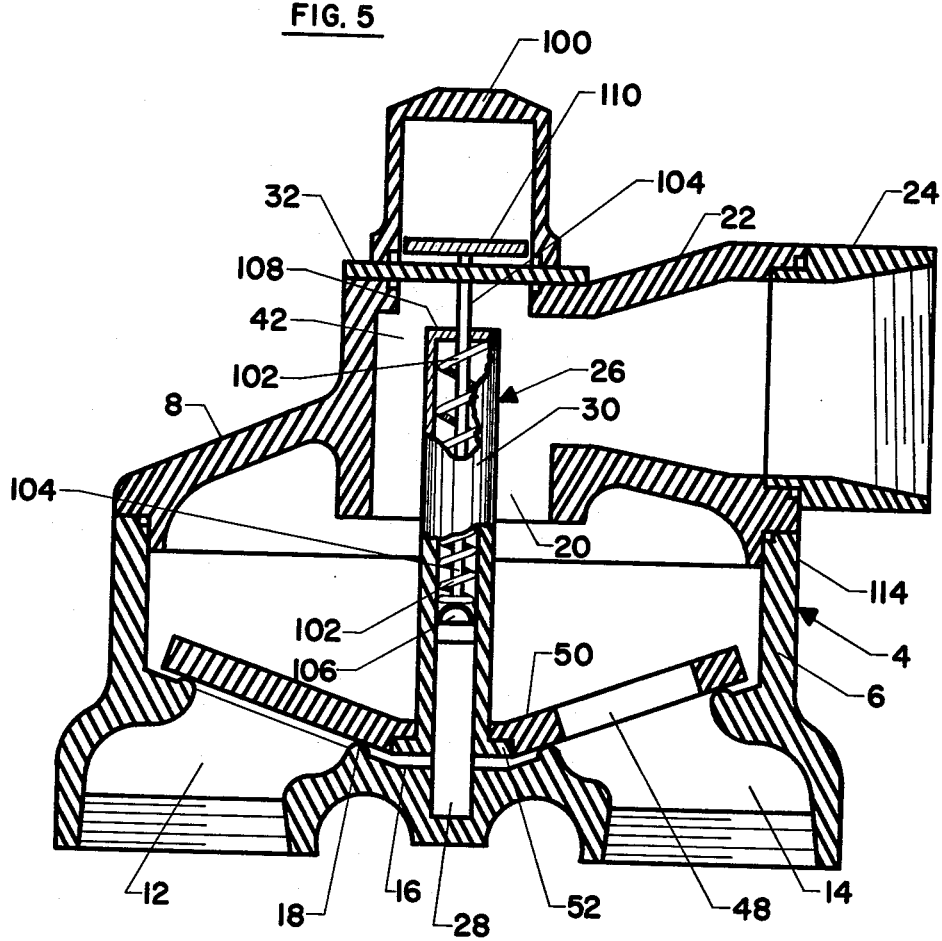
FIG. 5, is a cutaway side view of a second embodiment in a rest position.
Figure 6:
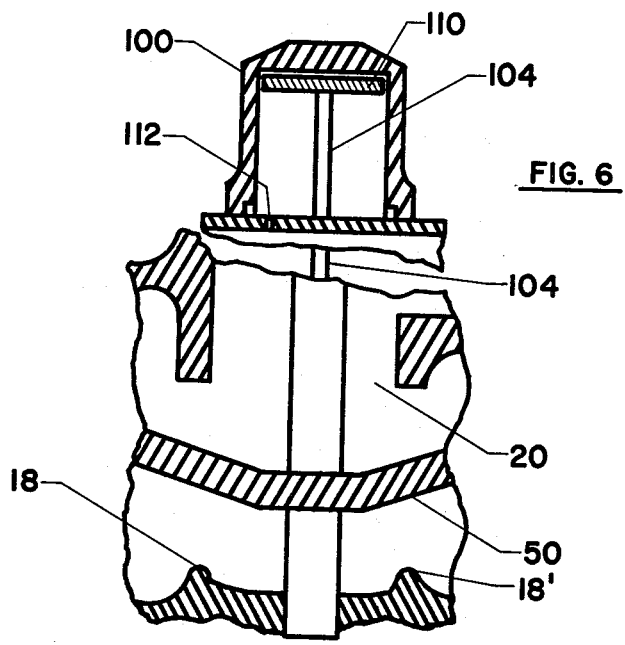
FIG. 6, is a cutaway side view of FIG. 5 just after the fluid inflow is terminated.

Referring now to FIGS. 5 and 6, showing a second embodiment of the invention, the sequencing sealing means or disc 50 is shown in the normal rest position in FIG. 5 without any water in the control piston chamber housing 100. The valve, as shown in FIG. 5, is ready to receive the inflow of fluid or water for the first time through inlet 20 for distribution out through outlet 14.

The disc 50 is connected to the shaft 30. Sequencing spring 102 is connected between a bulbous end 106 of rod 104 and the upper end 108 of shaft 30. The other end of rod 104 is connected to the piston 110. Rod 104 moves between the position shown in FIG. 5, the normal rest position and FIG. 6, the mid-cycle position. This sequencing valve control sequences the sealing disc from the rest position through the mid-cycle position back to the rest position prior to the inflow of fluid for the second time.

When fluid or water is introduced into the main valve chamber, a portion of the inflowing fluid will move slowly through opening 112 into control piston chamber housing 100. Piston 110 will move upwardly through half its cycle until the piston reaches the position shown in FIG. 6. Spring 102 is compressed. Sealing disc 50 will not move up until the inflowing fluid is stopped. When the inflowing fluid flow is terminated, sealing disc 50 will move upward and be rotated a half of a cycle by cam control means, not shown. The cam control means shown in FIGS. 1 and 2 may be used in the valve shown in FIG. 5. Thereafter the fluid in housing 100 will slowly bleed out of the housing through opening 112. Piston 110 will move downwardly replacing disc 50 into a position in contact with surface 16 or rings 18. Upon the inflow of fluid, the disc 50 will be sealed on rings 18 and surface 16. A check disc may be added to this valve as described in FIGS. 1 and 2.

Figure 7:
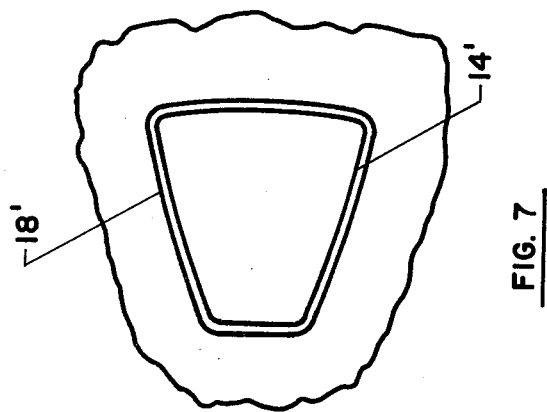
FIG. 7, is a partial cross-sectional view along line A—A and looking in the direction of the arrows.

Referring now to FIG. 7, showing the shape of a particular opening at the bottom of the housing 4, the mid-diameter of housing 4 and the diameter of the sealing disc 50 may remain the same even though a greater number of outlets of the same diameter are added to the housing 4, shown in FIG. 5. Round openings 12 and 14 may be re-designed with a shape as shown in FIG. 7. Outlet 14' may be generally triangular, having the same area opening as outlet 14 in FIG. 5. Ring 18' encircles opening 14'. Sealing disc 50 may include openings having the same shape as opening 14'. The opening 14' is shown with adjacent sides of unequal size, that is, a side running in the general direction of a radius and a side running in the general direction of the perimeter of the disc.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A multi-port sequencing valve comprising:

a housing having a central fluid receiving chamber, a chamber inlet, a housing inlet in fluid communication with said chamber inlet of said chamber, and a plurality of outlets disposed substantially on the side opposite of said central chamber from said chamber inlet, said outlets having a surrounding inner surface substantially concave in shape;

a sequencing outlet sealing valve means having at least one aperture disposed therethrough and a sealing surface for contact with said inner surface of said housing, said outlet sealing valve means having a lower sloping engaging surface for engagement with said outlet surface to close at least some of said outlets, said lower sloping engaging surface of said outlet sealing valve means having a slope less than said surrounding inner surface of said housing to provide initial opening of said outlet sealing valve means in a non-fluid flow condition, a stem means connected to said housing;

said stem means including a reciprocally movable portion with one end connected to the central portion of said outlet sealing valve means, said movable portion positioned centrally said housing;

a control valve means connected to said movable portion of said stem means and positioned on said movable portion to move into said chamber inlet to provide a barrier to fluid within said chamber inlet from passing out through said chamber inlet;

a biasing means connected to said movable portion of said stem means for rotating normally opening said outlet sealing valve means and positioning said control valve means within said chamber inlet when fluid stops flowing through said chamber inlet into said chamber, fluid flow through said housing moves said control valve means out of said chamber inlet and said outlet sealing valve means into sealing engagement with said inner surface of said housing, a cam means connected to said stem;

said cam means including a first portion connected to said housing and a second cam portion connected to said stem for engagement with said first portion to rotate said outlet sealing valve means during reciprocal movement of said movable portion of said stem;

said first portion connected to said housing and being removably connected to said housing whereby said first portion of said cam means may be easily replaced.

2. A multi-port sequencing valve as set forth in claim 1 wherein,
said first portion includes a cam surface with at least one portion positioned outside said housing in a cover means.

3. A multi-port sequencing valve as set forth in claim 1 wherein,
said first portion includes an upper and lower cam face, said upper and lower cam face with at least one portion positioned outside said housing in a cover means for removal purposes without opening said housing,
said second portion includes two cam followers spaced apart on said stem means and positioned for engagement with opposite cam faces.

4. A multi-port sequencing valve as set forth in claim 1 wherein,
said one aperture has a narrow width and a longer radial dimension to provide access to said outlets.

5. A selector valve as set forth in claim 1 wherein,
said housing includes a vent means in said housing to relieve pressure differences in said housing, said vent means includes a vent through said housing and a ball means connected to said vent for valving purposes.

6. A water-operated selector valve comprising:
a housing including a main portion with a plurality of outlets adjacent one end of the housing, a centrally located inlet in the housing to direct the outward flow of fluid in a generally uniform pattern toward said plurality of outlets, said housing including a generally concave internal surface about said outlets.

an outlet sealing valve means having at least one aperture, a stem connected at one end to said sealing valve means and disposed centrally in the housing, said stem having an axis that passes through the inlet, said stem connected to said housing for rotating and reciprocating in respect to said housing, an inlet valve means connected to said stem for movement toward and away from said centrally located inlet by fluid passing from said centrally located inlet toward said outlets for moving said sealing valve means against said outlets, a stem biasing means for positioning said inlet valve means in relation to said central inlet and moving said sealing means away from said outlets when no fluid is flowing through said housing, said sealing valve means movable toward and away from the outlets by the fluid passing from said centrally located inlet toward said outlets for sealing all said outlets except those in juxtaposition with the apertures, said sealing valve means rotatable with said stem to move said aperture from outlet to outlet, a cam means including at least one sequencing cam and at least one cam follower, said can means connected to said housing and to said stem to control the movement of said stem, said sealing valve means and said inlet valve to position said aperture, said sealing valve means includes a generally concave surface facing said centrally located inlet for supporting the weight of incoming fluid to aid in downward movement of said sealing valve means and an opposite convex sealing surface.

7. A selector valve as set forth in claim 6 wherein;
said sequencing cam is removeably connected adjacent the top of said housing above the main fluid path through said inlet whereby said sequencing cam may be removed and changed without opening the main portion of said housing.

8. A selector valve as set forth in claim 6 wherein:
said convex sealing surface is a sloped surface,
said housing has a sloping surface having a slope less than the slope of said sealing surface sloping surface,
said sealing valve means movable by fluid into mating engagement with said housing sloping surface to seal at least one outlet.

9. A selector valve as set forth in claim 8 wherein;
said sequencing cam 15 removably connected adjacent the top of said housing, and
said housing includes a removable cam cover on the top of said housing, whereby said sequencing cam may be removed ahd changed, without opening the main portion of said housing.

* * * * *